United States Patent [19]

Nishida et al.

[11] 3,990,352
[45] Nov. 9, 1976

[54] CONTROL VALVE
[75] Inventors: Kazumori Nishida; Akihiro Toyomura; Masami Hashimoto, all of Hirakata, Japan
[73] Assignee: Kabushiki Kaisha Komatsu Seisakusho, Tokyo, Japan
[22] Filed: Oct. 7, 1975
[21] Appl. No.: 620,322

[30] Foreign Application Priority Data
Oct. 11, 1974 Japan.............................. 49-116130

[52] U.S. Cl................................ 91/434; 137/102; 137/625.69
[51] Int. Cl.² ...................................... F15B 13/14
[58] Field of Search...................... 137/102, 625.69; 91/434

[56] References Cited
UNITED STATES PATENTS
3,106,135 10/1963 McAfee ............................ 91/434 X
3,473,566 10/1969 Peppel ...................... 137/625.69 X
3,698,415 10/1972 Forster et al. ..................... 91/434 X
3,895,703 7/1975 Schmitt et al.............. 137/625.69 X

Primary Examiner—Alan Cohan
Assistant Examiner—Gerald A. Michalsky
Attorney, Agent, or Firm—Armstrong, Nikaido & Wegner

[57] ABSTRACT

A control valve is provided which is designed to be set in place on a hydraulic circuit of a two-drum type hydraulic-actuated winch for controlling the actuation of the hook and the boom of a crane, and to be employed for actuating a hoisting-up clutch, a hoisting-down clutch, and a brake.

A control valve is designed with a spool and a sliding lever arranged in place in the main body of the valve in such a manner as to be free to slide therein, with the said sliding lever connected with a control lever for the hook and the boom, wherein the operating capability of the said control lever is so set in place as to be on a higher level than the hydraulic operating capability to be fed to hydraulic equipment.

4 Claims, 10 Drawing Figures

| | HOOK UP | HOOK DOWN | BOOM UP | BOOM DOWN |
|---|---|---|---|---|
| FIRST CONTROL VALVE | O ENGAGE HOOK UP CLUTCH | X | X | X |
| SECOND CONTROL VALVE | X | O ENGAGE HOOK DOWN TLUTCH | X | X |
| THIRD CONTROL VALVE | O RELEASE HOOK BRAKE | O RELEASE HOOK BRAKE | X | X |
| FOURTH CONTROL VALVE | X | X | O ENGAGE BOOM UP CLUTCH | X |
| FIFTH CONTROL VALVE | X | X | X | O ENGAGE BOOM DOWN TLUTCH |
| SIXTH CONTROL VALVE | X | X | O RELEASE BOOM BRAKE | O RELEASE BOOM BRAKE |

O SHOWS OPERATING POSITION
X SHOWS NON-OPERATING POSITION

CONTROL VALVE

BACKGROUND OF THE INVENTION

The present invention relates to a control valve for proper control of the hydraulic pressure to be discharged from a hydraulic pressure source to a hydraulic device such as a hydraulic-actuated clutch or the like, and in particular to a control valve wherein the hook and the boom of a crane are arranged in the hydraulic circuit of a two-drum type hydraulic-actuated winch to control the actuation thereof, thus actuating a hoisting-up clutch, a hoisting-down clutch, and a brake in actuation in a proper manner.

A conventional control valve of this category is of such a construction that the control valve is directly actuated by a control lever for applying and releasing the hydraulic pressure from a hydraulic pressure source to a hydraulic device. Therefore, a series of such defects that an operator cannot properly sense out at all the hydraulic pressure thus fed to the hydraulic device, and that proper judgment cannot be passed with regard to the state of the hydraulic device in actuation are involved therein naturally enough.

SUMMARY OF THE INVENTION

Now, one purpose of the present invention rests with providing a control valve for a hydraulic device in which the abovementioned defects have been completely eliminated.

Another purpose of the present invention rest with providing a control valve for a hydraulic device wherein the operating capability of a control lever is properly caused to be increased up to a higher level than that of the hydraulic pressure fed to the hydraulic device, whereby an operator thereof is enabled to properly sense the hydraulic pressure in the hydraulic device.

Through the proper employment of the control valve used in the present invention, or to put it otherwise, by the arrangement thereof in a hydraulic circuit of a hydraulic device as for example, a two-drum type hydraulic-actuated winch or the like, an operator thereof can properly sense an increase and a decrease in the hydraulic pressure by means of a control lever; therefore, and the operator is thus enabled to conduct effective operation thereof with a sense of security.

Since the operating capability of the control lever is enhanced sharply enough by virtue of the clutch engagement pressure, the operator can aptly sense whether the clutches are properly engaged.

Other purposes, features and advantages of the present invention will be made apparent enough through the following detailed description of a preferred embodiment thereof taken in conjunction with the accompanying drawings.

BRIEF DESCRIPTION OF THE DRAWINGS

FIG. 4 through FIG. 6 are drawings to show an illustration of the control valve of the present invention, of which

DETAILED DESCRIPTION OF THE PREFERRED EMBODIMENT

Figure 1:
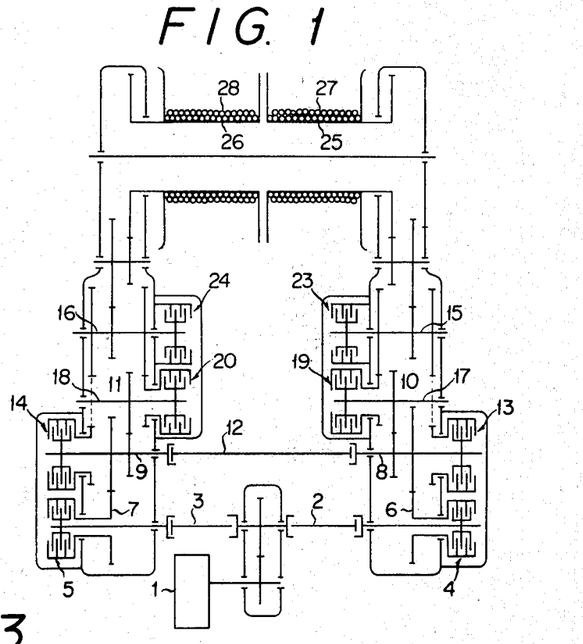
FIG. 1 is a diagrammatic explanatory diagram of a motive power transmission for a two-drum type hydraulic-actuated winch.

A detailed description of the preferred embodiment of the present invention will be given below, by making reference to the accompanying drawings. In FIG. 1, motive power from a motive power source 1 is transmitted to a low-speed clutch 4 on the right side and a high-speed clutch 5 on the left side through the right and the left universal joint shafts 2, 3, respectively. Gears 6, 7 of the said low-speed and high-speed clutches 4, 5 are engaged with gears 10, 11 of the primary clutch shafts 8, 9 on the side of a hook and on the side of a boom, respectively. The said primary clutch shafts 8, 9 are connected with each other into an integral entity by means of a universal joint shaft 12. The primary clutch shafts 8, 9 have a hook hoisting-up clutch 13 and a boom hoisting-up clutch 14 properly fitted in place thereon, respectively, and the clutches 13, 14 have the follower sides thereof connected to brake shafts 15, 16, respectively. Also, the primary clutch shafts 8, 9 are connected for drive transmission to the secondary clutch shafts 17, 18, respectively. The secondary clutch shafts 17, 18 have a hook hoisting-down clutch 19 and a boom hoisting-down clutch 20 properly set in place thereon, respectively, and the clutches 19, 20 have the follower side thereof properly connected to the brake shafts 15, 16, respectively. And the brake shafts 15, 16 have a hook brake 23 and a boom brake 24 properly set in place thereon, respectively. The brake shafts 15, 16 are connected for drive transmission with a hook and boom drum 25 and a hook and boom drum 26, respectively, through an intermediate shaft. 27, 28 represent a wire rope coiled on the drums 25, 26, respectively.

The hook and boom brakes 23, 24 are so designed as to be switched "ON" by the force of a spring, and switched "OFF" by hydraulic pressure. The hoisting-up clutches 13, 14 and the hoisting-down clutches 19, 20 for the hook and the boom, and the low-speed clutch 4 and the high-speed clutch 5, are so designed as to be switched "ON" by hydraulic pressure and switched "OFF" by the force of a spring.

Figure 2:
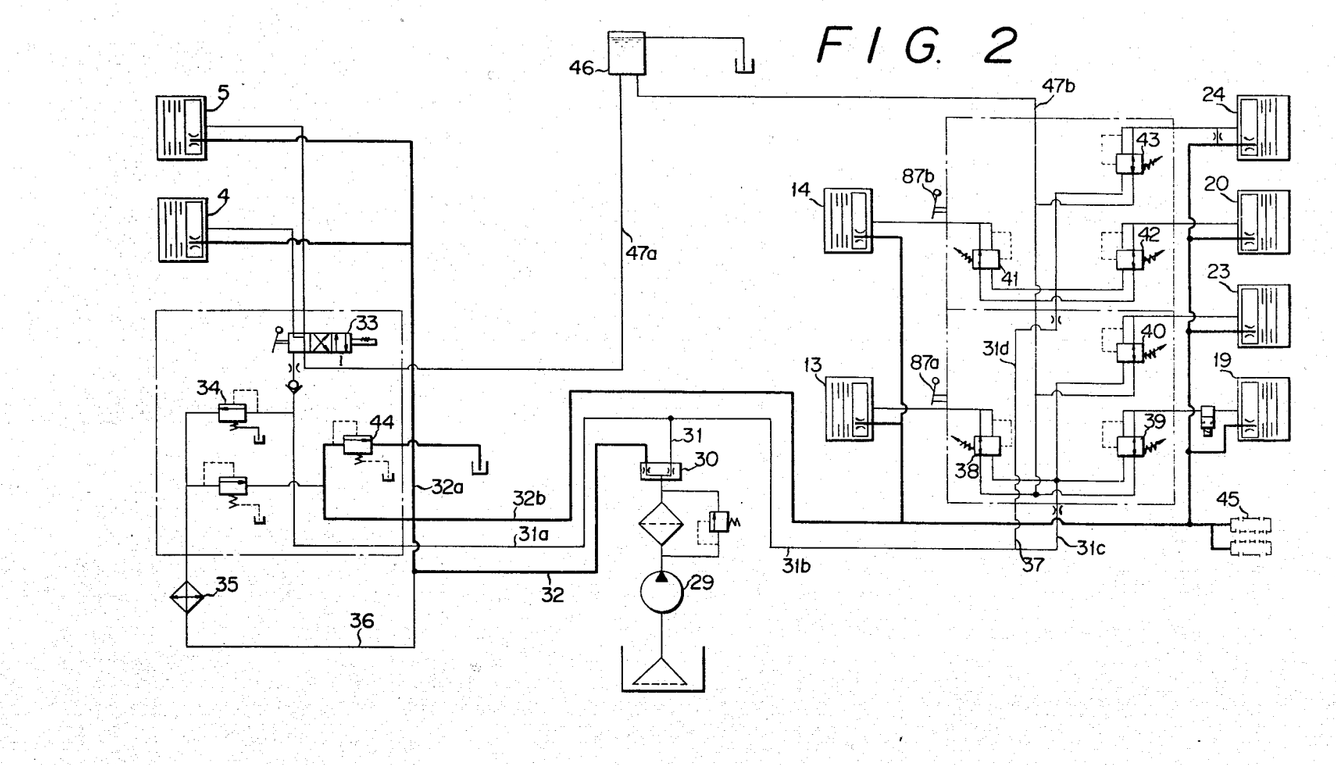
FIG. 2 is a hydraulic circuit diagram thereof.

The operating devices for the said brakes and clutches are as shown in FIG. 2.

To put it in concrete terms, a fluid discharged from a hydraulic pressure source 29 is divided by a flow distribution valve 30 in such a manner as to run into a hydraulic oil pipeline 31 and into a lubricating oil pipeline 32; furthermore, the hydraulic oil pipeline 31 is further divided into a primary hydraulic oil pipeline 31a and a secondary hydraulic oil pipeline 31b, and the lubricating oil pipeline 32, on the part thereof, is further divided into a primary lubricating oil pipeline 32a secondary lubricating oil pipeline 32b, respectively.

The primary hydraulic oil pipeline 31a is properly controlled in such a manner as to be connected selectively with either one of the low-speed clutch 4 and the high-speed clutch 5 through a high-speed/low-speed changeover valve 33, and, when the pressure in the primary hydraulic oil pipeline 31a either reaches or exceeds the level of the pressure specified for a pressure-control valve 34, the hydraulic oil in the primary hydraulic oil pipeline 31a as returns into the lubricating oil pipeline 32 by way of a by-pass line 36 provided with a cooler 35.

The secondary hydraulic oil pipeline 31b is divided at a turning point 37 into a hydraulic oil pipeline 31c for the hook and a hydraulic oil pipeline 31d for the boom. The hydraulic oil pipeline 31c has the primary, the secondary and the tertiary control valves, for instance, working pressure variable control valves 38, 39, 40 connected therewith in parallel, and each one of the control valves 38, 39, 40 is retained in place at a nonworking position in a state of being energized at all times. When the control valves are operated to assume the working position thereof by an operating mechanism as is set forth below hydraulic pressure is applied to the hook hoisting-up clutch 13, the hook hoisting-down clutch 19, and the hook brake 23. The hydraulic oil pipeline 31d for the boom has the fourth, the fifth, and the sixth control valves, for instance, working pressure variable control valves 41, 42, 43 connected in parallel therewith. Each one of the control valves 41, 42, 43 is retained in place at a nonworking position in a state of being energized at all times, and, when operated to assume the working position thereof applies hydraulic pressure to the boom hoisting-up clutch 14, the boom hoisting-down clutch 20, and the boom brake 24.

The lubricating oil pipeline 32 has a relief valve 44 for setting lubricating oil pressure and thus maintaining the oil pressure at a proper level at all times. The primary lubricating oil pipeline 32a runs for lubrication into the space formed between the linings of the low-speed clutch 4 and the high-speed clutch 5, and the secondary lubricating oil pipeline 32b runs for lubrication into each one of the clutches 13, 14, 19, 20, and each one of the brakes 23, 24, and also into a gear engagement section 45.

A supplemental tank 46 is installed at a position higher than each and every one of the clutches 4, 5, 13, 14, 19, 20 and each and every one of the brakes 23, 24 as well, and the tank is so designed as to conduct supplementary oil to each and every one of the hydraulic oil pipelines through the primary and secondary auxiliary pipelines 47a, 47b, to thus effectively prevent air from being included into any one of the hydraulic oil pipelines.

When the high speed/low speed changeover valve 33 is set at the position (I) for high speed, and the primary and the tertiary control valves 38, 40 are properly operated so as to be respectively set at the working positions thereof as well, the clutch 5 for high-speed operation and the hook hoisting-up clutch 13 are put in the state of being contacted, and the hook brake 23 is put in the state of being released; therefore, the hook drum is hoisted up and revolved, and the hook is thus put in inclined motion in the upward direction.

Figure 3:
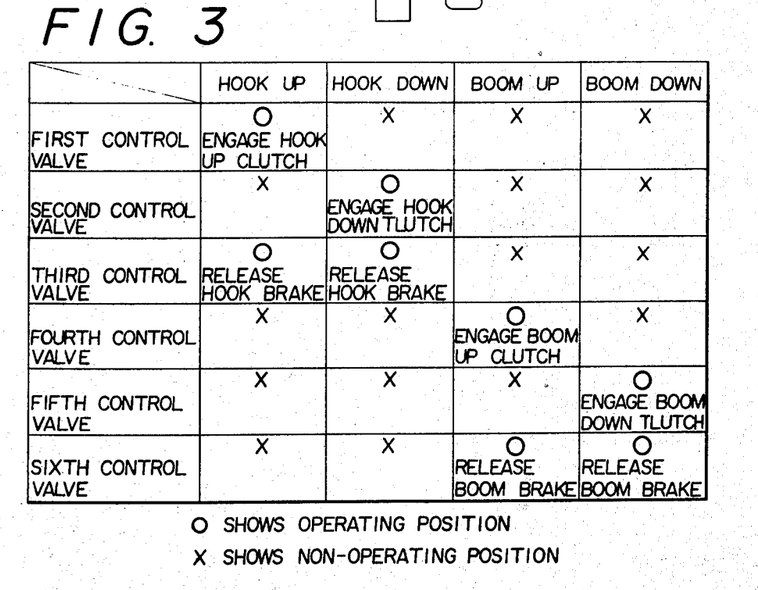
FIG. 3 is a table showing the relation between the operation and actuation of a winch using the present invention.
Figure 4:
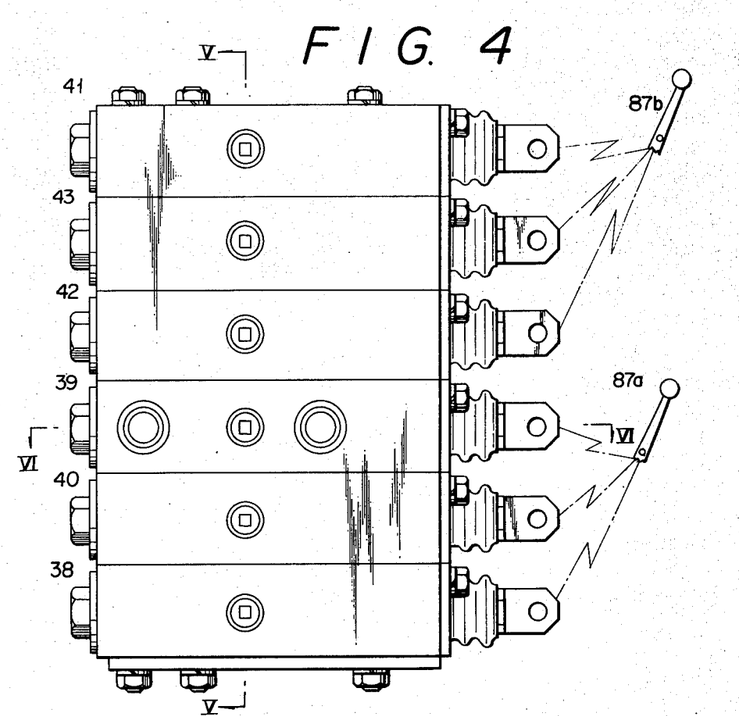
FIG. 4 is a front view.

Furthermore, in the case of operation in other manner, the state thereof will be such as is shown in FIG. 3, whereof a detailed description will be omitted.

Figure 5:
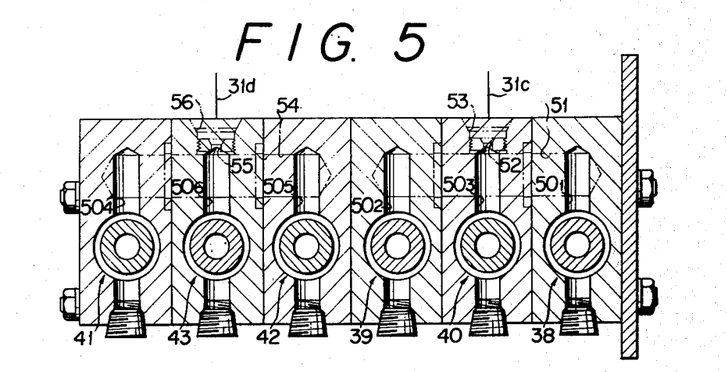
FIG. 5 is a sectional drawing viewed along the V—V line shown in FIG. 4.

Next, a description of the said primary control valve through the sixth control valve, 38 through 43, will be given below in concrete terms with regard to the construction thereof. The control valves 38 through 43 are fixed in place in a parallel manner in the following order: as the primary one, the tertiary one, the secondary one, the fifth one, the sixth one, and the fourth one. The respective inlet ports $50_1$, $50_3$, $50_2$ of the primary, the secondary, and the tertiary control valves 38, 40, 39 are connected in a through manner by means of a passageway 51 in such a manner as is shown in FIG. 5, and are further connected in a through manner with the said hydraulic oil pipeline 31c for the hook a port 53 having an orifice 52. The respective inlet ports $50_5$, $50_6$, $50_4$ of the fifth, the sixth, and the fourth control valves are connected in a through manner by means of a passageway 54 as shown in FIG. 5, and are further connected in a through manner with the hydraulic oil pipeline 31d for the boom at a port 56 having an orifice 55.

Figure 6:
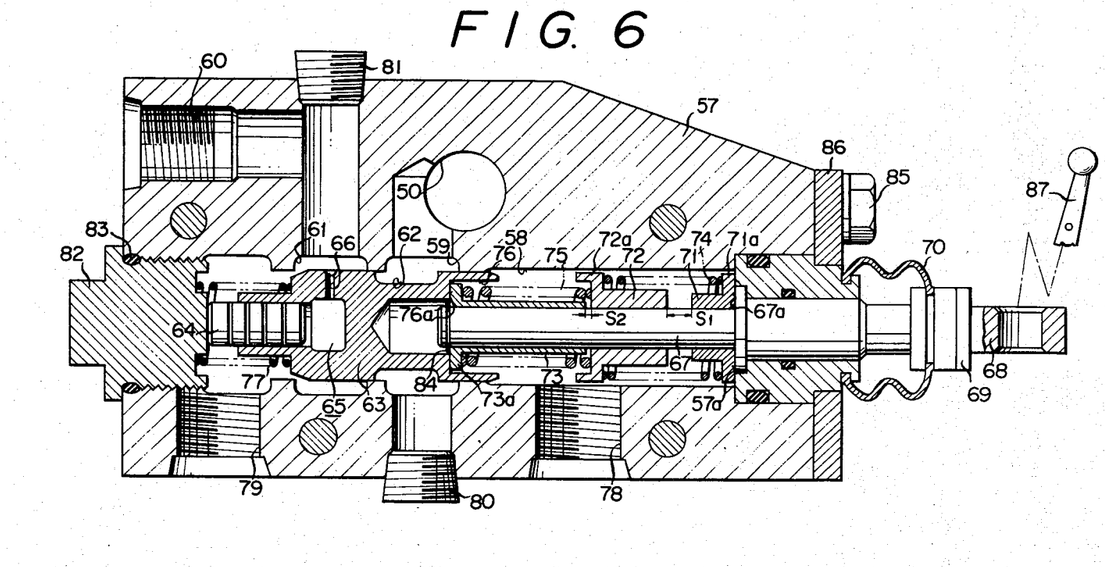
FIG. 6 is a sectional drawing viewed along the VI—VI line shown in FIG. 4, FIG. 7 through FIG. 9 are sectional drawings showing the actuation of the control valve.

The said control valves 38 through 43 are constructed in such a manner as is shown in FIG. 6. The valve hole 58 in the main body of the valve 57 has a primary port 59 connected in a through manner with an inlet port 50 and a secondary port 61 connected in a through manner with an outlet port 60. The valve hole 58 has a spool 63 provided with a shoulder 62 positioned in the primary and the secondary ports 59 and 61 in such a manner as to be free to slide therein. The spool 63 has a load piston 64 properly fitted in place thereinto in such a manner as to be free to slide in hole 58. A pressure-receiving chamber 65 of the load piston 64 is connected in a through manner with the secondary port 61 through an aperture 66. 67 is a sliding lever fitted in place into the main body 57 of the valve, the butt end section of the said sliding lever 67 projecting to the outside of the main body 57 of the valve. A yoke 68 is connected therewith in such a manner as to form an integral entity by means of a nut 69. Bellows 70 are properly fitted in place in such a manner as to cover the joint of the main body 57 of the valve with the yoke 68, and the sliding projection of the sliding lever 67 is properly covered thereby, thus preventing dust from penetrating into the space thus covered. The sliding lever 67 has the primary, the secondary and the tertiary collars 71, 72, 73 properly fitted in place thereon externally in such a manner as to be free to slide therein. A space is formed between the flange section 71a of the primary collar 71 and the flange section 72a of the secondary collar 72 and a primary spring 74 is fitted in place therein in an elastic manner. A space is formed between the flange section 72a of the secondary collar 72 and the flange section 73a of the tertiary collar 73 and a secondary spring 75 is fitted in place therein in an elastic manner. By virtue of such a construction as this, the flange section 71a of the primary collar 71 is properly caused to come in contact in the state of being energized with the stepped portion 67a of the sliding lever 67 and the butt end section 57a of the main body 57 of the valve, the flange section 73a of the tertiary collar 73 is properly caused to come in contact in the state of being energized with the bottom wall 76a of such a hole 76 as is drilled in the end section of the spool 63, and the space formed between the primary collar 71 and the secondary collar 72 has an interstice $S_1$ properly formed therein. A space formed between the secondary collar 72 and the tertiary collar 73 has an interstice $S_2$ properly formed therein. The spool 63 is properly set in place at such a position as intercepts the primary port 59 and the secondary port 61, in a state of being energized towards the right by the tertiary spring 77. 78, 79 are drain ports, 80, 81, 82 are plugs, 83 is an O-ring, 84 is a snap ring for snap-in fitting of the tertiary collar 73, 85 is a bolt which clamps a plate 86 on the main body 57 of the valve, and 87 is a control lever which puts the sliding lever 67 to forced actuation.

Next, a description of the actuation of the control valve will be given below, by making reference to FIG. 6 through FIG. 10.

When the control lever 87 is set at a neutral position, the sliding lever 67 and the spool 63 are retained in place in the state of being energized as shown in FIG. 6, such that hydraulic fluid fed through the inlet port 50 does not flow but is retained until the hydraulic pressure rises up to such a level of pressure as is specified for a relief valve arranged in the pipeline. In FIG. 6, the relation among the forces of the springs is such as is shown in the formula given below: Force of primary spring 74 = Force of secondary spring 75 > Force of tertiary spring 77.

Figure 7:
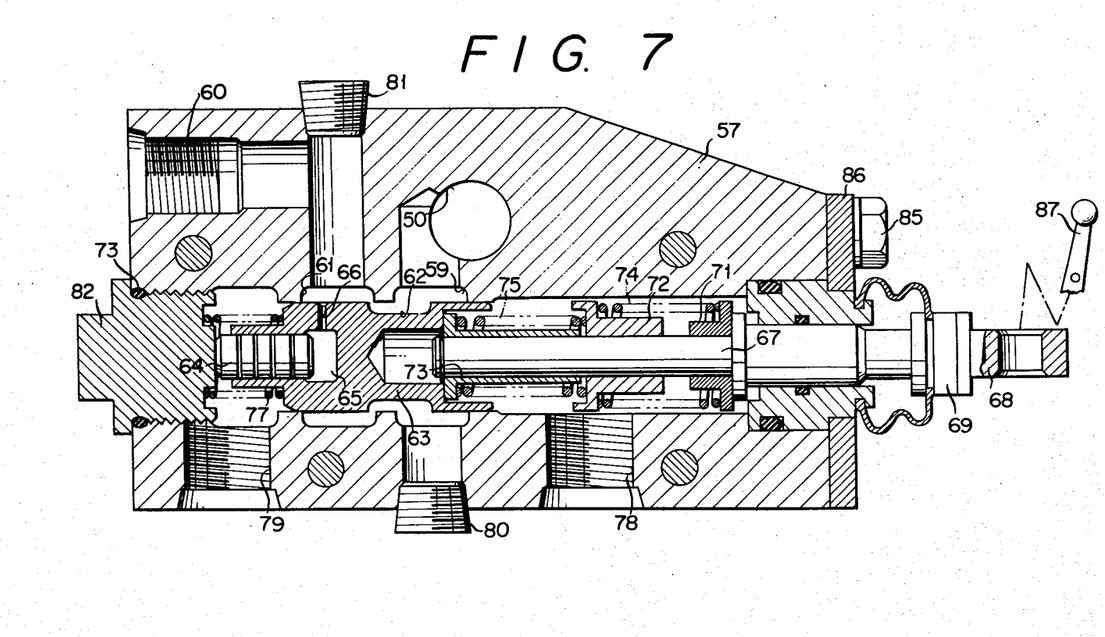

When control lever 87 is operated to move sliding lever 67 to the left as shown in the drawing, the tertiary spring 77 is subjected to compressive deformation, and the spool 63 slides in the leftward direction in such a manner as is shown in FIG. 7, until the spool 63 is connected to the primary port 59 and the secondary port 61. In this case such a relation as is expressed by the formula of — the degree of rise in the repulsion force of the secondary spring 75 > the degree of rise in the repulsion force of the primary spring 74 > the degree of rise in the repulsion force of the tertiary spring 77 — is established thereby. (Point A in FIG. 10). Therefore, the hydraulic fluid that flows thereinto through the inlet port 50 is discharged from the outlet port 60 by way of the primary port 59, the shoulder section 62, and the secondary port 61. At this time, the pressure-receiving chamber 65 of the load piston 64 receives the hydraulic fluid from the outlet port 60 through an aperture 66, and, the force causes the load piston 64 to thrust the spool 63 in the rightward direction shown in the drawing. The hydraulic fluid discharged through the outlet port 60 reaches a value ($P_1$ in FIG. 10) that is proportionate to the manipulated variable of the control lever 87 and the operating force of the control lever 87 is the sum of the compressive force of the tertiary spring 77 plus the force applied in the rightward direction by the load piston. ($F_1$ in FIG. 10).

Figure 8:
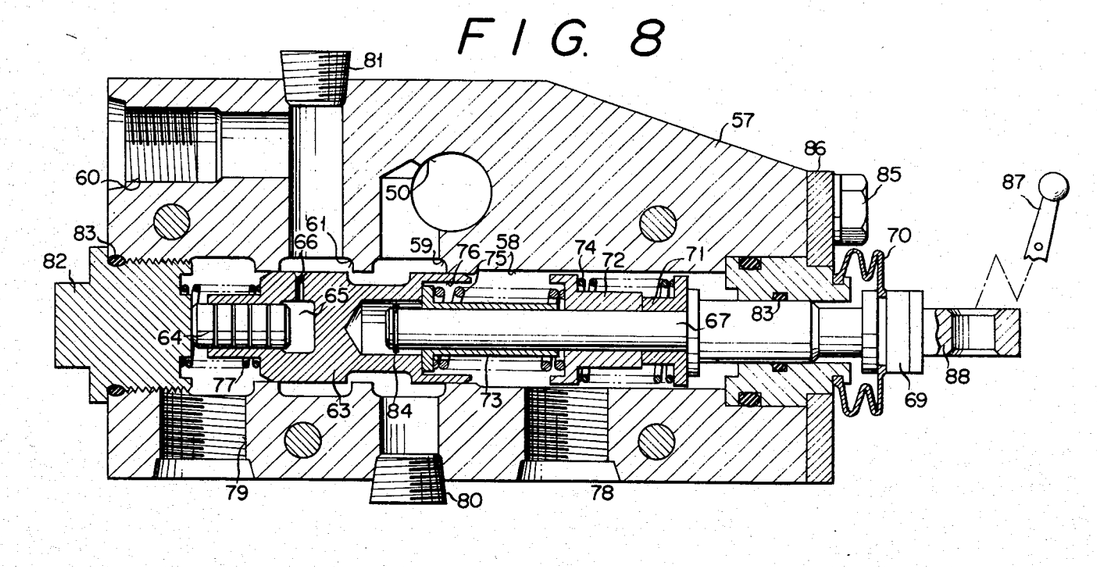
Figure 9:
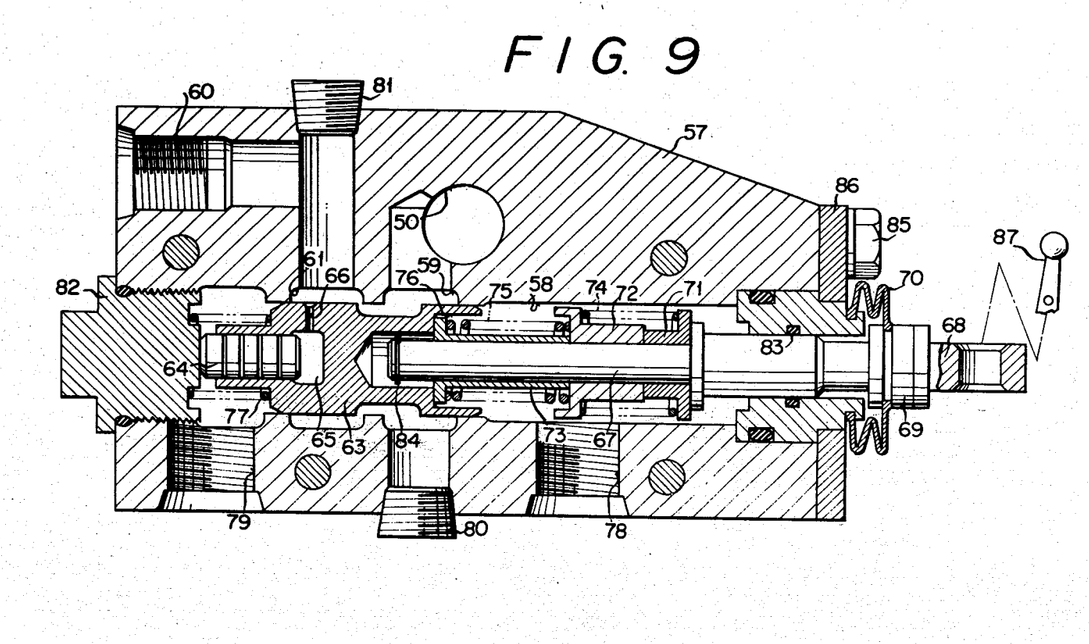
Figure 10:
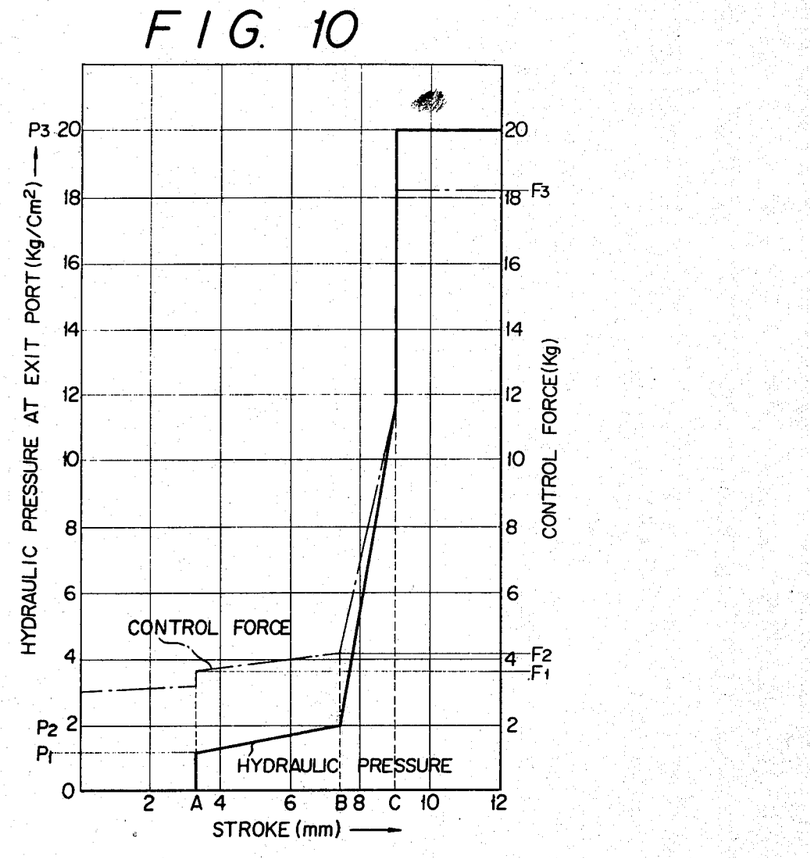
FIG. 10 is a chart showing the relationship between the stroke, the operating capability and the hydraulic pressure.

When the control lever 87 is further operated from in the above-mentioned state (shown in FIG. 7) to thus cause the sliding lever 67 to be moved in the leftward direction shown in the drawing, the hydraulic pressure at the outlet port 60 is gradually elevated up to a higher level, and the force to move in the rightward direction by virtue of the load piston 64 grows larger; therefore, the operating force of the control lever 87 is elevated up to a higher level, whereby the primary spring 74 and the secondary spring 75 are caused to be compressed, until the primary collar 71 and the secondary collar 72 are caused to come in contact with each other in such a manner as is shown in FIG. 8. (Point B in FIG. 10). At this time, the hydraulic pressure is such as is given the marking of $P_2$ in FIG. 10, and the operating force is such as is given the marking of $F_2$ in FIG. 10, respectively. To put it otherwise, the rise in the hydraulic pressure from the point A up to the point B in FIG. 10 is determined by the relation between the repulsion force of the primary spring 74 and that of the secondary spring 75 (in this case, the primary spring 74 and the secondary spring 75 are the same in terms of the repulsion force thereof due to their being arranged in series) on the one hand, and the sum of the righward force given by the load piston 64 and the repulsion force of the tertiary spring 77 on the other hand. Therefore, the primary spring 74 and the secondary spring 75 both function in series up to the point B, the degree of the rise in the repulsion force is rather gentle and slow, and the hydraulic pressure thus rises in a gentle and slow manner correspondingly. When the control lever is put in operation from in the above-mentioned state (FIG. 8) to thus thrust the sliding lever 67 in the leftward direction shown in the drawing, the secondary spring 75 having a larger degree of the rise in repulsion force is thereby subjected to compression; therefore, the operating force thereof is increased in a sharp manner, and the hydraulic pressure at the outlet port 60 is thus caused to rise in a sharp manner as well. And, when the sliding lever 67 is further thrusted in the leftward direction shown in the drawing, the primary, the secondary, and the tertiary collars 71, 72, 73 are formed into an integral entity in such a manner as is shown in FIG. 9. (Point C in FIG. 10). When the primary, the secondary, and the tertiary collars 71, 72, 73 are thus formed into an integral entity, the spool 63 is so actuated as to be moved by virtue of the sliding lever 67 to such a position where the primary port 59 and the secondary port 61 are connected in a through manner; therefore, the hydraulic pressure at the outlet port 60 is thereby caused to rise sharply enough up to the specified level of pressure ($P_3$ in FIG. 10) for the relief valve in the pipeline, and the operating force of the control lever 87 is thereby caused to rise in a sharp manner as well. ($F_3$ in FIG. 10).

With the hydraulic pressure $P_2$ at the point B at the level of the engagement pressure of each and every one of the clutches, an operator can sense that each and every one of the clutches is properly engaged, through the fact that the operating force of the control lever 87 is thus caused to rise in a sharp manner. Accordingly, in case the control lever 87 is so operated as to be moved to the point B, and the point B is selected as the starting point for operation, the fill time as is conventionally required for filling the portion of the stroke volume of each clutch can be saved in a favorable manner.

Furthermore, since the hydraulic pressure at the point B is low and the clutches are sliding with a light thrust applied thereon, and since the brake still remains to be released, no hydraulic fluid is required for elevating the hydraulic pressure, until the brake is released; therefore, proper timing between the control lever 87a and the hook drum 25, or between the control lever 87b and the boom drum 26, can be ensured readily enough, thus enabling the relation between the control levers 87a, 87b, as well as the movement of the hook and/or the boom at the time of the ascent or descent thereof, to be properly sensed by an operator.

The control lever 87 includes lever 87a for the hook and one lever 87b for the boom. The control lever 87a for the hook is connected with the primary, the secondary, and the tertiary control valves 38, 39, 40 in such a manner as to actuate the primary and the tertiary control valves 38, 40 at the same time, and to actuate the secondary and the tertiary control valves 39, 40 at the same time, respectively. The control lever 87b for the boom is connected with the fourth, the fifth, and the sixth control valves 41, 42, 43 in such a manner as to actuate the fourth and the sixth control valves 41, 43 at the same time, and to actuate the fifth and sixth control valves 42, 43 at the same time, respectively.

An illustration of the present invention reveals that the control valve introduced in the present invention has the following advantages.

A two-drum type hydraulic-actuated winch can be operated by a pair of control levers 87a, 87b, furthermore, clutches, respective brakes, and other sections required to be lubricated can be properly lubricated at all time, thus kept free from being subjected to an accident of seizure due to shortage of a lubricant.

Since the operating force F of the control lever 87 is increased sharply enough by the clutch engagement pressure, an operator can sense that the respective clutches are kept in the state of being properly engaged in place.

The inlet ports $50_1$, $50_2$, $50_3$ of the primary, the secondary, and the tertiary control valves 38, 39, 40 for the hook are, respectively, so designed as to be capable of being employed in common, and to open into the hydraulic oil pipeline 31c for the hook through a throttle valve 52. The inlet ports $50_4$, $50_5$, $50_6$ of the fourth, the fifth, and the sixth control valves 41, 42, 43 for the boom are so designed as to be capable of being employed in common, and to open into the hydraulic oil pipeline 31d for the boom through a throttle valve 55. A constant flow of hydraulic fluid runs as an influent through the inlet ports 50 of the respective control valves at all times, when the said respective control valves remain to be in the state of being operated, irrespective of either independent operation or interlocking operation of the respective control valves, as well as of the discharge level of a pump and therefore, the time difference between the operation of the control lever 87 and the respective clutches and brakes is properly kept free from being subjected to fluctuations.

Since the hydraulic pressure discharged through the outlet port 60 of each control valve rises in a slow and gentle manner as shown in FIG. 10, each clutch is caused to be properly engaged in place in a slow and smooth manner.

Since the control valves 38, 39, 40 for the hook are grouped into a single set, the control valves 41, 42, 43 for the boom are grouped into a single set, and the both are subjected to proper throttling through the throttle valves 52 and 55, respectively, the control valves 38, 39, 40 for the hook and the control valves 41, 44, 43 for the boom are properly kept free from reciprocal back-flow of the hydraulic fluid.

Since the primary, the secondary, and the tertiary collars 71, 72, 73 are properly grouped into an integral entity at the point C shown in FIG. 10, and the sliding lever 67 is put in forced actuation in conjunction with the actuation of the control valve 87, irrespective of the thrust force of the load piston 64, the said collars 71, 72, 73 are properly kept free from being subjected to throttling by a flow hose.

Since the primary control valve through the sixth control valve 38 – 43 are so constructed as to be common, only except for the main bodies thereof, the respective control valves can be properly incorporated in place completely free from an error, and they are constructed of elements of a simple design.

The control valve introduced in the present invention is of such a construction as is set forth in the preceding paragraphs; therefore, the operating force of the control lever 87 is larger than the hydraulic pressure to be applied to a hydraulic device, thus enabling an operator thereof to properly sense out the hydraulic pressure in the hydraulic device.

What is claimed is:

1. A control valve comprising:
   a. a valve body including a primary port connected to a source of hydraulic fluid, a secondary port connected to a hydraulic device and a valve hole therethrough, said primary and secondary ports extending from said valve hole to the exterior of said valve body;
   b. a spool slideably positioned in said valve hole;
   c. a load piston slideably positioned in said spool wherein a pressure receiving chamber is formed with said spool between said load piston and an internal member of said spool, said pressure receiving chamber being connected to said secondary port;
   d. a control lever positioned externally of said valve body;
   e. a sliding lever slideably positioned in said valve hole, said control lever controlling the movement of said sliding lever;
   f. primary, secondary and tertiary collars mounted on said sliding lever wherein spaces are formed between said primary, secondary and tertiary collars;
   g. a primary spring positioned in the space between said primary and secondary collars, and
   h. a secondary spring positioned between said secondary and tertiary collars.

2. The control of claim 1 including a plug member fixed in one end of said valve hole, and a tertiary spring positioned between said plug and said spool wherein said tertiary spring normally maintains said spool in a position blocking said primary and secondary ports when said control lever is in a neutral position.

3. The control valve of claim 2 wherein when said control lever is in the neutral position, the relative positioning of said collars, said spool and said plug are such that the expansion forces of said spring is such that the expansion of said primary spring equals the expansion force of said secondary spring and is greater than the expansion force of said tertiary spring.

4. The control valve of claim 2 wherein when said control lever is moved from said neutral position, the relative positioning of said collars, said spool and said plug are such that the rise in the expansion force of the secondary spring is greater than the rise in the expansion force of said primary spring which is greater than the rise in expansion force of said tertiary spring.

* * * * *